Feb. 10, 1931.  W. RICHTER  1,792,243
APPARATUS FOR ELECTRIC ARC WELDING
Filed Jan. 21, 1928
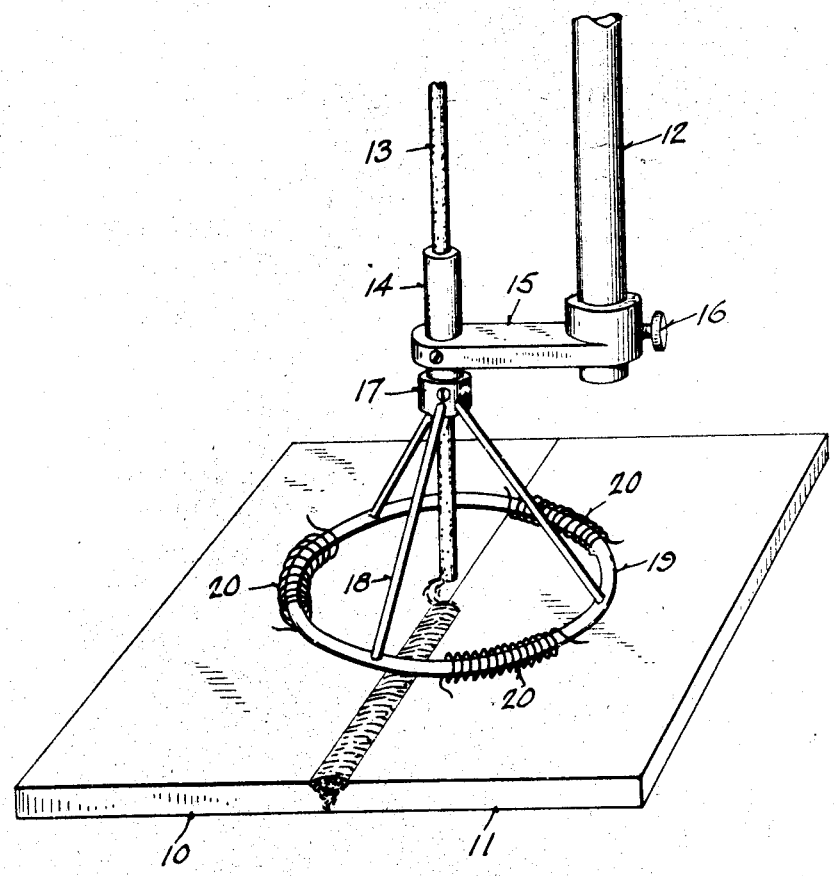
INVENTOR.
WALTHER RICHTER
BY
ATTORNEY.
WITNESS:

Patented Feb. 10, 1931

1,792,243

UNITED STATES PATENT OFFICE

WALTHER RICHTER, OF MILWAUKEE, WISCONSIN, ASSIGNOR TO A. O. SMITH CORPORATION, OF MILWAUKEE, WISCONSIN, A CORPORATION OF NEW YORK

APPARATUS FOR ELECTRIC-ARC WELDING

Application filed January 21, 1928. Serial No. 248,368.

This invention relates to an improvement in the method of and apparatus for electric arc welding, disclosed in the concurrent application of Karl Strobel, filed January 21, 1928, Serial No. 248,367.

The said application sets forth the use of a permanent magnet, in the field of which an electric arc is formed. In that application, means are provided for imparting a movement of rotation to the magnet, the action of which diverts the arc at an angle of approximately 90-degrees from its axis, and at the same time effects the rotation of the arc. Hence, the heat of the latter is not concentrated at any one point in the work of heating of the parts to be welded, but is progressively applied to the area of the metal within the circle traversed by the arc, so that the area of metal becomes gradually heated to its full depth in the degree necessary to produce a welding temperature or state of fusion therein.

This method of heating by a progressively reoccurring application of heat, instead of a concentrated one, avoids the burning of the surface stratum of the metal, usually attending the attempts to weld thick metal plates by the practice of the older processes of arc welding. Moreover, the radial and sweeping action of the arc over the surface to be welded, acts to purge the joint then being welded of all impurities and occlusions, such as would impair the value of the same, and permits the production of a welded joint of superior quality.

In the present invention, instead of rotating the magnet for the purpose of effecting a rotation of the field, a stationary electromagnet is employed, the several coils of which are oppositely energized in succession so as to cause a rotary movement of the field of the magnet to take place. A corresponding rotary movement of the arc is induced by the travel of the magnetic field. In other particulars, the operation is the same as that which is set forth in the application before referred to.

The specific novelty residing in the invention will now be described, and then pointed out in the appended claims.

The accompanying drawing is a perspective view showing the construction of an apparatus in which my invention has been embodied.

In the drawing, the numerals 10 and 11 indicate two thick metal plates, the squared, abutting ends of which are to be welded on their meeting line.

A post 12 depends from the usual welding head, which latter comprises means responsive to variation in the welding current for automatically controlling the rate of the forward feeding movement of the weldrod 13, or welding wire, at the point of which the arc is formed. The free end of the weldrod is guided by a tubular eye piece 14, carried at the outer end of an arm 15, the other end of the latter being bored to embrace the post 12, and adjustable both axially and radially thereon, by means of a set screw 16, threaded into a perforation in the arm, and bearing with its point against the post 12.

Secured upon the lower end of the eye piece 14, is a collar 17, to which the inner ends of diverging and downwardly extending arms 18 in plural number are connected. At their lower ends the said arms support in stationary position an iron ring 19, on which spaced coils 20 may be arranged in any suitable number. In the drawing, these coils are shown spaced 120 degrees apart.

The adjacent ends of the separate coils 20 are connected to the separate leads of a three phase alternating current circuit. A magnetic field is thus set up within the iron ring 19 due to magnetic leakage therefrom intermediate the coils caused by the difference in the current strength in the individual coils at each point in the cycle of the three phase alternating current system. The current strength in the separate coils is thus progressively and uniformly changing during the current cycle causing a resultant uniform changing of the direction of the magnetic field within the ring 19. This causes a rotary movement of the arc which prevents a concentration of the heat at a single point in the welded line and permits the heat to be applied progressively and uniformly over a circular area of rotation to produce a gradual heating of the metal surface therein. The speed of rotation may be regulated by changing the cycle of the current.

Any suitable number of coils 20 may be employed and alternating currents of any suitable number of phases may be employed therewith. It is also possible by the use of switching means to oppositely energize the magnets in proper sequence with a direct current in which case the various coils are intermittently energized.

A carbon arc, instead of a metallic arc, may be employed with equally satisfactory results.

Having thus described my invention, what I claim and desire to secure by Letters Patent of the United States, is:

1. An electric arc welding apparatus comprising an electrode in arcing relation to the metal to be welded, a plurality of magnets arranged around the arc, and means for varying the strengths of said magnets progressively in rotation about the arc to set up a rotating magnetic field transverse to the arc and thereby cause a circular travel of the arc with respect to its normal axis.

2. An apparatus for electric welding comprising an electrode in arcing relation to the metal to be welded, a magnetic ring concentric with said electrode, three equally spaced current conducting coils arranged on said ring, and means connecting the adjacent ends of said coils to separate leads of a three-phase alternating current circuit whereby the current strength in each of said coils is progressively and uniformly changed to effect a rotation of the arc about its normal axis.

3. An electric arc welding apparatus comprising an electrode in arcing relation to the metal to be welded, means for establishing a magnetic field transverse to the arc to divert the same from its normal axis, and electrical means for varying said field in rotation to thereby cause a circular movement of the arc about its normal axis.

4. An apparatus for electric arc welding comprising means to establish and maintain the welding arc, means including at least three electro-magnets arranged in a circle about the arc in the same horizontal plane therewith to set up a magnetic field transverse to the arc to divert the same from its normal axis, and means to oppositely energize said magnets in rotary progression to thereby change the direction of the magnetic field and effect a circular traveling of the arc.

5. An apparatus for electric arc welding comprising means to establish and maintain the welding arc, at least three electro-magnets arranged in a circle about the arc in the same horizontal plane therewith to set up a magnetic field transverse to the arc to divert the same from its normal axis, a multiphase source of alternating current, and connections between the said electro-magnets and the separate phase leads of the said current source whereby said magnets are energized in rotary progression to thereby change the direction of the magnetic field and effect a circular traveling of the arc.

6. An apparatus for electric arc welding comprising an electrode in arcing relation to the metal to be welded, an iron ring arranged concentric to the arc and in substantially the same plane therewith, a plurality of spaced coils mounted on said ring, and means for passing a multi-phase alternating current through said coils with the separate phases of the current passing through separate coils whereby a magnetic field uniformly changing in direction is set up within said iron ring and transverse to the arc.

7. An apparatus for electric arc welding comprising an electrode in arcing relation to metals to be welded, a plurality of electro-magnets, not less than three, arranged in a circle about the arc in substantially the same horizontal plane therewith and substantially equally spaced from each other, and means to intermittently energize said magnets in rotary sequence to set up a rotary magnetic field transverse to the arc.

In testimony whereof, I have signed my name at Milwaukee, this 19th day of January, 1928.

WALTHER RICHTER.